United States Patent
Niranjan et al.

(10) Patent No.: US 8,249,605 B2
(45) Date of Patent: Aug. 21, 2012

(54) SYSTEMS AND METHODS FOR OPTIMIZING THE TOPOLOGY OF A BLUETOOTH SCATTERNET FOR SOCIAL NETWORKING

(75) Inventors: Niranjan, Richardson, TX (US); Mohan Reddy Duggi, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 11/750,045

(22) Filed: May 17, 2007

(65) Prior Publication Data

US 2008/0080397 A1 Apr. 3, 2008

Related U.S. Application Data

(60) Provisional application No. 60/827,323, filed on Sep. 28, 2006, provisional application No. 60/869,529, filed on Dec. 11, 2006.

(51) Int. Cl.
*H04W 40/00* (2009.01)
(52) U.S. Cl. .......................... 455/446; 370/254
(58) Field of Classification Search .................. 455/446; 370/254
See application file for complete search history.

(56) References Cited

U.S. PATENT DOCUMENTS

| | | | | |
|---|---|---|---|---|
| 6,690,918 B2 * | 2/2004 | Evans et al. | .................. | 455/41.2 |
| 6,879,570 B1 * | 4/2005 | Choi | .............................. | 370/329 |
| 6,944,455 B2 * | 9/2005 | Bonta et al. | .................... | 455/449 |
| 7,006,437 B2 * | 2/2006 | Ogier et al. | ................. | 370/230.1 |
| 7,263,063 B2 * | 8/2007 | Sastry et al. | .................. | 370/235 |
| 7,356,347 B1 * | 4/2008 | Kammer | ........................ | 455/517 |
| 7,539,507 B2 * | 5/2009 | Grob et al. | ..................... | 455/522 |
| 2007/0008905 A1 * | 1/2007 | Berger et al. | .................. | 370/254 |
| 2008/0267147 A1 * | 10/2008 | Niranjan et al. | ............. | 370/338 |
| 2008/0270554 A1 * | 10/2008 | Niranjan et al. | ............. | 709/206 |

OTHER PUBLICATIONS

Canan Pamuk and Ezhan Karasan. "SF-DEviL: Distributed Bluetooth Scatternet Formation Algorithm based on Device and Link Characteristics", Proceedings of the Eighth IEEE International Symposium on Computers and Communication, 2003.p. 5. Department of Electrical and Electronics Engineering, Bilkent University, Ankara, Turkey.*

Manish Kalia, Sumit Garg, Rajeev Shorey. "Scatternet Structure and Inter-Piconet Communication in the Bluetooth System." pp. 1-2. IBM India Research Lab, New Delhi, India.*

European Search Report; EP Application No. 07117543.4-2413; Apr. 11, 2008; 9 pgs.

Kalia, Manish, et al.; "Scatternet Structure and Inter-Piconet Communication in the Bluetooth System"; IBM India Research Lab, Year 2000, 4 pgs.

Dharia, Sagar I., et al.; "A Novel Distributed Resource-Aware Scalable Scheme for Scatternet Formation"; OBR Research Center, University of Cincinnati; Sep. 28, 2003; pp. 659-664.

(Continued)

*Primary Examiner* — Nick Corsaro
*Assistant Examiner* — Sowmini Nair (57) ABSTRACT

A wireless device is provided that includes a processor configured to execute instructions that promote performing a method. The method includes determining a user profile of a user of the wireless device. The method also includes determining a relationship of the wireless device to a topology of a wireless network wherein the wireless device is a node, the relationship of the wireless device to the topology of the network based at least in part on the user profile.

20 Claims, 5 Drawing Sheets

OTHER PUBLICATIONS

Pamuk, Canan, et al.; "SF-DeviL: Distributed Bluetooth Scatternet Formation Algorithm Based on Device and Link Characteristics"; Department of Electrical and Electronics Engineering, Bilkent University; Jun. 30, 2003; 6 pgs.

Yang, Myeong-a, et al.; "A Social Group-aware and Tunnel-based Scatternet Formation Scheme"; Information and Communications University; Mar., 2007; 6 pgs.

* cited by examiner

SYSTEMS AND METHODS FOR OPTIMIZING THE TOPOLOGY OF A BLUETOOTH SCATTERNET FOR SOCIAL NETWORKING

CROSS-REFERENCE TO RELATED APPLICATIONS

This application claims priority to U.S. Provisional Patent Application No. 60/827,323, entitled "Method for Topology Configuration Based on User Profile in a Bluetooth Scatternet for Social Networking", filed on Sep. 28, 2006, by Niranjan, et al., and to U.S. Provisional Patent Application No. 60/869,529, entitled "Topology Configuration Based on User Profile in a Bluetooth Scatternet for Social Networking", filed on Dec. 11, 2006, by Niranjan, et al., both of which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In communications networks, the topology is usually a schematic description of the arrangement of a network, including its nodes and connecting lines. There are two ways of defining the network geometry: a physical topology and a logical topology. The physical topology of a network is the actual geometric layout of the nodes, while the logical topology refers to the nature of the paths that signals follow from node to node. In many instances, the logical topology is the same as the physical topology.

There are several common physical topologies, including the bus network, the star network, and the ring network. In the bus network topology, every node is connected to a main cable called the bus. Therefore, in effect, each node is directly connected to every other node in the network. In the star network topology, there is a central computer or server to which all the nodes are directly connected. Thus, every node is indirectly connected to every other node through the central computer. In the ring network topology, the nodes are connected in a closed loop configuration. Adjacent pairs of nodes are directly connected. Other pairs of nodes are indirectly connected, the data passing through one or more intermediate nodes.

The common goal for each of these physical configurations is a fully-connected topology, meaning each node is directly or indirectly connected to all other nodes in the network. To achieve a fully-connected topology, connections between nodes are made randomly, or in rare cases, based on the master/slave role of the nodes, rather than the data flow pattern among the nodes. This results in an inefficient communication network for a number of reasons. Nodes having similar profiles, indicating the likelihood of frequent communication with each other, are often connected through paths requiring multiple hops. At the same time, nodes having dissimilar profiles, indicating the improbability of frequent communication with each other, may be directly connected. Moreover, nodes may be connected, either directly or indirectly, where no connection is required because these nodes will never communicate with each other.

SUMMARY

According to one embodiment, a wireless device is provided that includes a processor configured to execute instructions that promote performing a method. The method includes determining a user profile of a user of the wireless device. The method also includes determining a relationship of the wireless device to a topology of a wireless network wherein the wireless device is a node, the relationship of the wireless device to the topology of the network based at least in part on the user profile.

According to one embodiment, a method is provided for configuring the topology of a wireless network. The method includes defining profiles for users of wireless devices, and configuring the topology of the wireless network based on the user profiles.

In another embodiment, a computer-readable medium is provided storing instructions that, when executed by a processor, promote performing a method. The method including determining a user profile of a user of a wireless device. The method including using the user profile to determine the relationship of the wireless device to a topology of a wireless network.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A social networking environment has a data flow pattern, in which two devices having similar user profiles will communicate more often than will any two random devices. Therefore, optimizing the topology of a Bluetooth scatternet for social networking based on the expected data flow pattern between devices in the scatternet provides a topology that offers improved network performance over other topology configurations. Common topologies seek a fully-connected scatternet without consideration of the data flow pattern between devices in the scatternet. These topologies result in inefficient network performance because devices in frequent communication with each other are often connected through multiple hops and unnecessary connections between devices unlikely to communicate are maintained. By contrast, a topology optimized based on the expected data flow pattern between devices in the scatternet provides improved network performance because the number of connections between devices likely to communicate is minimized while, at the same time, there are no direct connections to maintain between devices unlikely to communicate.

To improve the performance of a Bluetooth scatternet for social networking, systems and methods for optimizing the topology of the scatternet are disclosed. Following the disclosed methods, a user profile is defined for the user of each Bluetooth enabled device or node in the scatternet and stored in association with that node. The user profile includes information relating to the user of the node which the user may share in common with users of other nodes in the scatternet, that commonality likely indicating the users will communicate with each other through the nodes. Such information may include age, gender, undergraduate college, church affiliation, if any, types of preferred entertainment, e.g. movies, opera, or the ballet, and the like.

Other information is also stored in association with each node. That information includes the node's Bluetooth media access control (MAC) address, its current role within the piconet where it resides, e.g. master, slave, free, or master-slave, and its piconet information. Piconet information identifies other nodes on the same piconet and their associated roles.

Two indices, the user profile index (UPI), which is the encoding of the user profile, and the matching profile index (MPI), are employed to determine the degree of similarity between user profiles associated with any two nodes, where the higher the degree of similarity, the more likely the users will communicate with each other using the two nodes. Two other indices, the piconet profile index (PPI) and the maximum piconet profile index (MPPI) are employed to position nodes with associated similar user profiles in the same piconet. Lastly, the piconet diff profile index (PDPI) is employed to minimize the number of piconets in the topology.

For each node in the Bluetooth scatternet, these indices are evaluated. Based on the resulting values of these indices, the topology of the scatternet is optimized by directly connecting nodes with similar profiles or including them in the same piconet and by minimizing the number of piconets in the topology.

Systems are disclosed for implementing this methodology. To optimize the Bluetooth scatternet topology using the disclosed methodology, the processor of each node in the scatternet locally executes a tool which may be implemented in software, hardware or processor, for example. For each node, the tool identifies other nodes that share similar user profiles, where similar user profiles indicate the likelihood of data flow, meaning communication, between users of the nodes. When another node with a similar user profile is identified, the tool connects the two nodes or locates them within the same piconet. In order to connect or position nodes in this manner, the tool may sever connections between nodes having dissimilar profiles, relatively speaking. Thus, data flow between nodes with similar profiles is localized within a single piconet, and in some circumstances, solely between the nodes. Moreover, nodes that do not have similar profiles are not connected or are not positioned within the same piconet. The resulting optimized topology improves the Bluetooth scatternet performance because the number of connections between nodes likely to communicate is minimized while, at the same time, there are no direct pathways to maintain between nodes unlikely to communicate.

Before describing the disclosed systems and methods in detail, it is helpful to review some Bluetooth technology basics. Bluetooth wireless technology is a short-range communications technology intended to replace the cables connecting portable and/or fixed devices while maintaining high levels of security. Bluetooth technology has achieved global acceptance such that any Bluetooth enabled device, almost anywhere in the world, can connect to other Bluetooth enabled devices in proximity. Bluetooth enabled electronic devices, including cellular or other telephones, wireless laptops, personal digital assistants (PDAs), and MPEG-1 Audio Layer 3 (MP3) players, fixed devices such as wireless nodes or access points, converted computers and so on connect and communicate wirelessly through short-range, ad hoc networks known as piconets.

A piconet is formed when at least one Bluetooth enabled device connects with at least one other device. However, a piconet cannot support more than eight devices. Within a piconet, each device has a defined role, such as master, slave, and master-slave. A device that is designated "master" controls one or more other devices referred to as "slaves". A device that is designated "free" has no defined role, meaning it is neither a master nor a slave, while a device designated "master-slave" is both. These roles have meaning only within the context of the piconet. Moreover, a piconet may have only one master while all remaining devices within that piconet are slaves or free.

A Bluetooth enabled device may participate concurrently in two or more piconets, although it can never be a master of more than one piconet. It may, however, be a slave in many independent piconets. A Bluetooth enabled device that is a member of two or more piconets is said to be involved in a scatternet.

A scatternet is a group of two or more independent and non-synchronized piconets that share at least one common Bluetooth enabled device. For example, a scatternet may be formed from three independent piconets, all of which share a common Bluetooth enabled wireless laptop. There can be no more than 10 fully loaded piconets in a scatternet.

Within the context of a piconet or scatternet, the devices that make up the piconet or scatternet, whether or not Bluetooth enabled, may also be referred to as nodes. A node, for example, may be any device or system in the network such as a cellular telephone or PDA. Each node in a piconet or scatternet has a unique network address commonly referred to as its Media Access Control (MAC) address.

Figure 1:
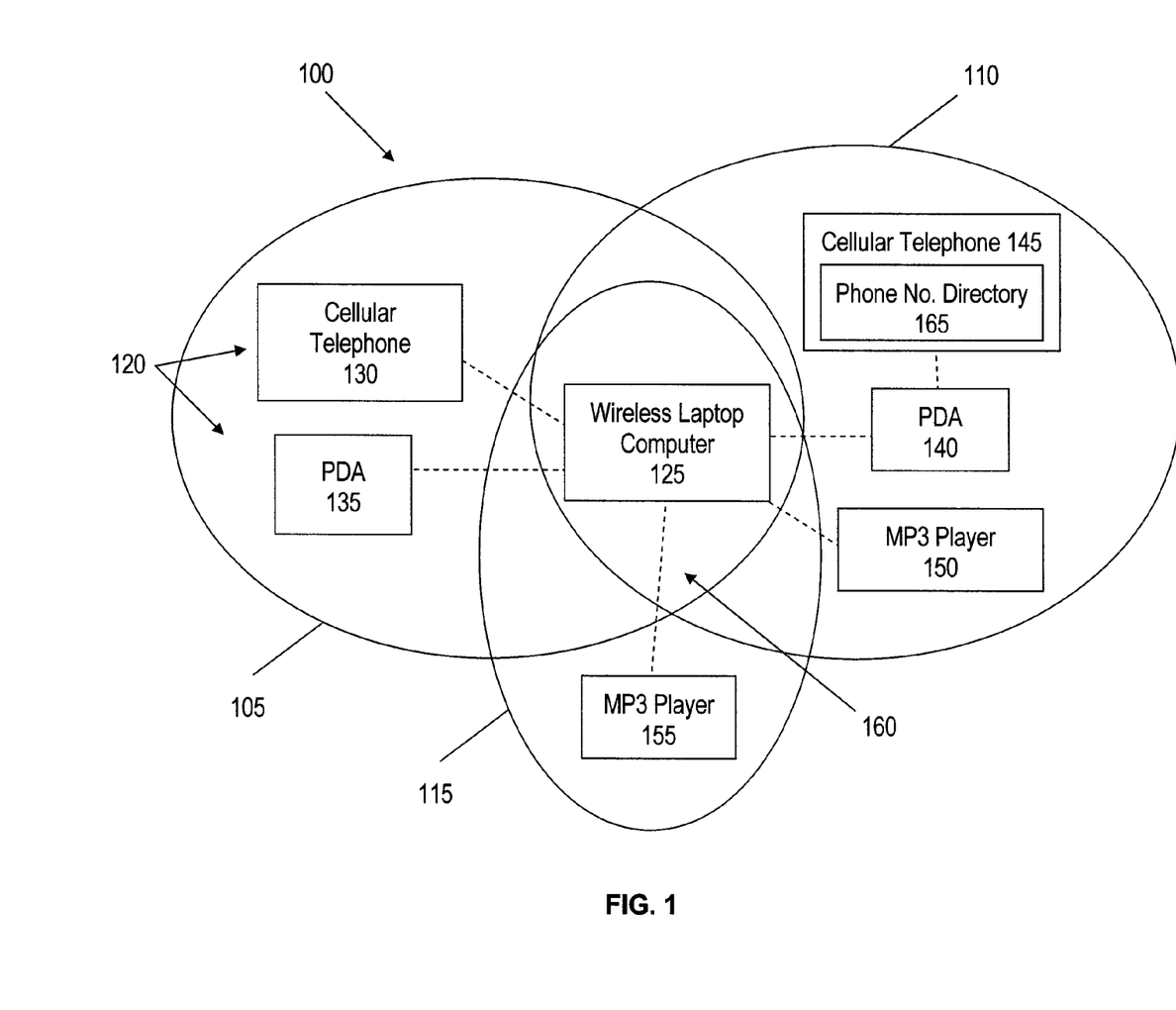
FIG. 1 is block diagram of an illustrative Bluetooth scatternet for social networking.

FIG. 1 illustrates one representative embodiment of a scatternet 100 comprising three piconets 105, 110, 115. Piconet 105 further comprises three nodes 120, which are a wireless laptop 125, a cellular telephone 130, and a PDA 135. Piconet 110 further comprises four nodes 120, which are a PDA 140, a cellular telephone 145, a MP3 player 150, and the wireless laptop 125. Piconet 115 further comprises two nodes 120, which are the wireless laptop 125 and a MP3 player 155. All nodes in the three piconets 105, 110, 115 are Bluetooth enabled.

In this representative scatternet 100, each piconet 105, 110, 115 shares a common Bluetooth enabled device, specifically the Bluetooth enabled wireless laptop 125. None of the piconets 105, 110, 115 have more than eight devices or nodes 120, and the scatternet 100 comprises no more than 10 fully loaded piconets.

There are also designations of connectivity between nodes 120 in this representative scatternet 100, illustrated by dashed lines 160, to indicate the pathway each node 120 uses to communicate with other nodes 120 in the scatternet 100. These dashed lines 160 represent the topology of the scatternet 100. The efficiency of the scatternet 100, meaning how quickly nodes 120 communicate and exchange data with each other, is affected by this topology. There is a direct connection between wireless laptop 125 and cellular telephone 130, which provides an efficient pathway for communication and data exchange between these two nodes 120.

However, should a user desire, for example, to transfer a copy of a phone number directory 165 stored on cellular telephone 145 to cellular telephone 130, there is no similar direct connection between these two devices. As such, the transfer of the directory 165 occurs indirectly, requiring multiple hops first from the telephone 145 to the PDA 140, then from the PDA 140 to the wireless laptop 125, and finally from the laptop 125 to the telephone 130. If such a transfer is a one time or infrequent occurrence, the efficiency of the scatternet 100 may be negligibly affected by this multi-hop transfer of data. On the other hand, if such a transfer of data occurs more frequently, the efficiency of the scatternet 100 is impacted, as the total time to complete frequent, multiple transfers of data accumulates. At the same time, the multiple hop transfer of data in this manner may affect other communications involving these nodes 145, 140, 125, 130, thereby slowing those communications and further degrading the scatternet 100 efficiency.

As previously described, commonly used network topologies are not based on the data flow pattern within a network. Hence, networks using those topologies are often inefficient, requiring multiple hops for communications between nodes, similar to the phone number directory 165 transfer presented above. Network efficiency may be improved, even optimized, by considering the expected data flow pattern of a network. For instance, the efficiency of scatternet 100 depicted in FIG. 1 may be improved by considering how often the phone number directory 165 will likely be transferred from cellular telephone 145 to cellular telephone 130 and modifying the topology, represented by the dashed lines 160, of this scatternet 100 to provide a more direct pathway for this transfer, thereby speeding up the transfer.

The disclosed systems and methods provide a means to optimize the topology of a Bluetooth scatternet based on the expected data flow pattern within the scatternet to provide improved scatternet efficiency. These systems and methods have particular value in scatternets used for social networking. In such network environments, individual social contacts are typically numerous and recurring because of common characteristics shared by the individuals involved. On the other hand, individuals in the social network with little in common typically do not communicate with each other. Based on these observations, the expected data flow pattern in the social network may be predicted as a function of the similarities among users in the network and used to optimize the network. As such, the data flow pattern of the social network need not be monitored. Rather, individual user profiles provide the basis for predicting the likely flow of data within the social network.

Figure 2:
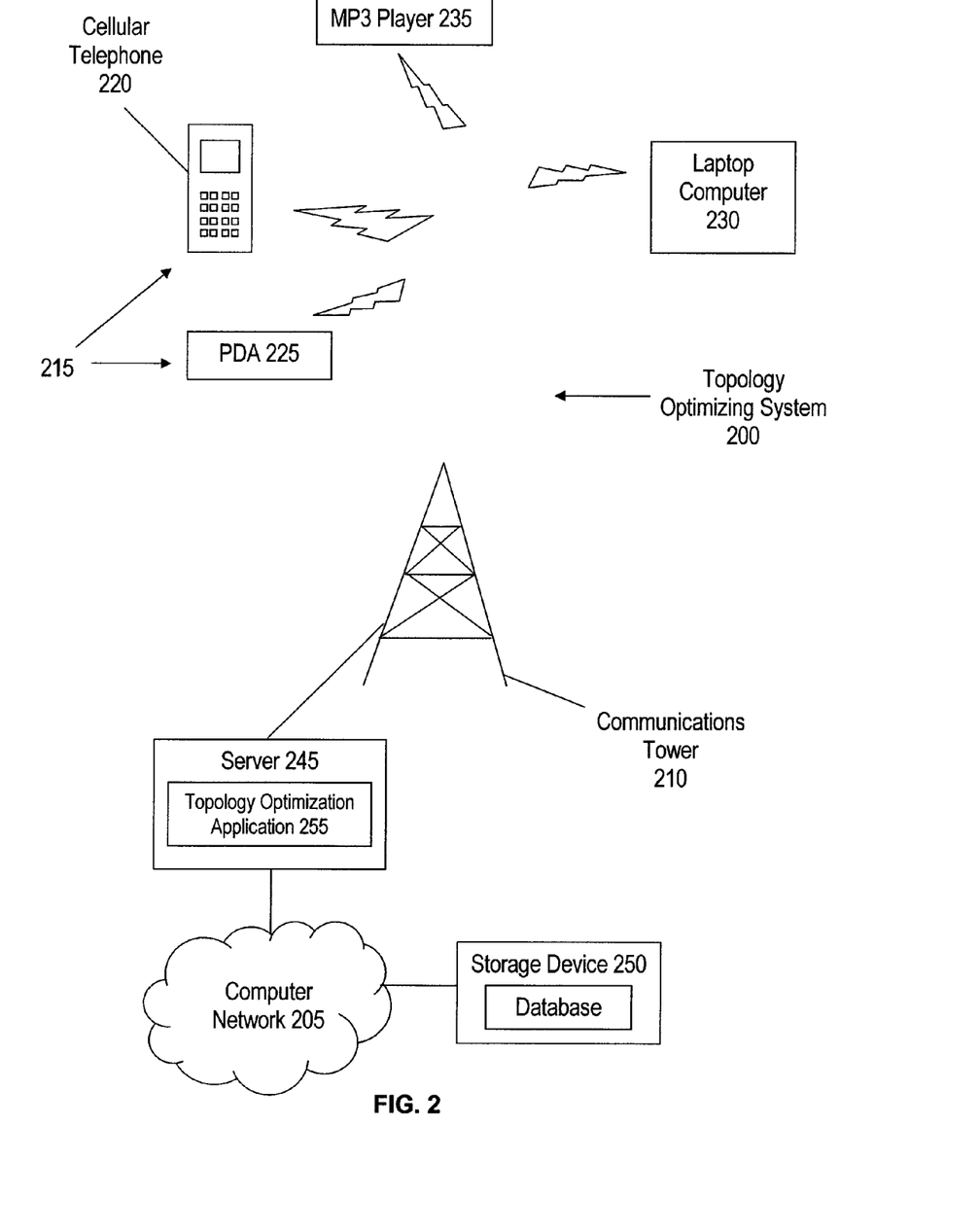
FIG. 2 is a block diagram of an illustrative system for optimizing the topology of a Bluetooth scatternet for social networking.

A telecommunications provider or network operator may execute methods for optimizing the topology of a Bluetooth scatternet based on the expected data flow pattern between nodes in the scatternet using the illustrative topology optimizing system 200 depicted in FIG. 2. In this embodiment, the system 200 comprises a computer network 205, a communications tower 210, and several Bluetooth enabled communications devices 215, specifically a cellular telephone 220, a PDA 225, a wireless laptop 230, and an MP3 player 235. The computer network 205 further comprises a server 245 and a storage device 250, neither of which are Bluetooth enabled.

A topology optimization application 255 is stored locally on each Bluetooth enabled device 215 but is not shown on the devices 215 in FIG. 2. The processor of each device 215 periodically executes the application 255. Moreover, a copy of the topology optimization application 255 might be stored on each device or might also be stored on server 245 and might be accessible through the computer network 205 to a database 260 stored on the storage device 250. The server 245 has access to the Bluetooth enabled devices 215 through the communications tower 210.

Although not depicted, one skilled in the art should readily appreciate that the system 200 may comprise other types of Bluetooth enabled devices 215. Moreover, the system 200 may comprise multiple such devices 215, although only a single PDA 225, cellular telephone 220, wireless laptop 230, and MP3 player 235 are depicted in FIG. 2. Similarly, the computer network 205 may comprise other servers, land-line computers and printers.

The topology optimization application 255 is a tool or application that optimizes the topology of a Bluetooth scatternet to improve its efficiency. In the system embodiment depicted in FIG. 2, the Bluetooth scatternet is defined by the Bluetooth enabled devices 215. These devices 215 are distributed among two or more piconets that make up the scatternet.

The topology optimization application 255 executes locally on the Bluetooth enabled devices in possession of the customers of the telecommunications provider. As customers in possession of these devices travel, the devices are also mobile, traveling in and out of communication range with other similar devices. When a first device detects another similar device, or a second device, the application 255 on the first device determines whether the second device should be directly connected to the first device or included in the same piconet as the first device by comparing the user profiles associated with the two devices. If the user profiles are determined to be similar, the devices may be directly connected or included in the same piconet, thereby locating the devices 215 on a single Bluetooth scatternet. This allows the devices 215 to communicate directly or more efficiently. On the other hand, if the user profiles are not determined to be similar, no action is taken by the application 255.

Later, as a device 215 in the Bluetooth scatternet travels beyond a range for which Bluetooth enabled communication is possible, the connection between the device and others in the Bluetooth scatternet is severed and the device ceases to be a node within the Bluetooth scatternet. The process of forming a Bluetooth scatternet when Bluetooth enabled devices detect other such devices with similar associated user profiles and severing connections to the scatternet when a device travels outside the range of communication may be constantly changing as customers in possession of such devices travel in and out of proximity to each other, where proximity is defined by the range possible for Bluetooth communication.

The telecommunications provider might store and maintain a primary source of the topology optimizing application 255 on server 245. Data needed to execute the application, if any, is stored in database 260 located on storage device 250 and accessible via the computer network 205. A backup copy of the application 255 may also be stored on storage device 250 for safe-keeping. Periodically and/or when modifications are made to the topology optimizing application 255, the telecommunications provider transmits a copy of the updated application 255 and any data needed to execute the application 255 from the server 245 and storage device 250 to all Bluetooth enabled devices carried by customers of the telecommunications provider, including the Bluetooth enabled devices 215 depicted in FIG. 2, using the communication tower 210.

The formation of a Bluetooth scatternet is possible because of the Bluetooth enabled communications capability of the devices 215. There is no need for devices 215 in the Bluetooth scatternet to communicate through the communication tower 210 and/or the server 245 because each device 215 is Bluetooth enabled and locally executes the topology optimizing application 255. The server 245 simply provides the means to store and maintain the primary source of the application 255, while the communications tower 210 provides the means to periodically transmit an updated or modified copy of the application 255 from the server 245, which is not Bluetooth enabled, to Bluetooth enabled devices carried by customers of the telecommunications provider.

The topology optimization application 255 optimizes the topology of a Bluetooth scatternet, including the scatternet comprising devices 215 depicted in FIG. 2, using a number of indices calculated as a function of information associated with each Bluetooth enabled device or node 215 in the scatternet. Depending on the values of these indices, nodes with similar user profiles are directly connected or positioned on the same piconet and the number of piconets in the scatternet is minimized to provide an optimized topology for the Bluetooth scatternet. The indices that form the basis of the topology optimization methodology are addressed in the following paragraphs.

For each Bluetooth enabled node 215 in the scatternet, information is stored in association with the node 215. In some embodiments, this information includes the user profile index (UPI) of the node, defined below, the current role of the node 215, e.g. master, slave, master-slave, and free, the MAC address of the node 215, the piconet information of the node 215. The latter is dependent upon the role of the node 215. If the role of node 215 is master, the piconet information for node 215 includes the MAC address, role and UPI of all of its slaves. If that role is slave, the piconet information includes the MAC address, role and UPI of its master and all other slaves located on the same piconet as node 215. If that role is master-slave, the piconet information includes the MAC address, role and UPI for its master, its slaves, and all slaves positioned on the same piconet as node 215.

The user profile includes information related to the user of the node which the user may share in common with users of other nodes in the scatternet, that commonality likely indicating the nodes will communicate with each other. Such information may include surname, age, gender, undergraduate college, types of preferred entertainment, e.g. movies, opera, or the ballet, church affiliation, or any and all information that might be used to determine the likelihood of nodes communicating. The user profile is then encoded. The encoded user profile is the User Profile Index (UPI). Thus, each Bluetooth enabled node 215 in the scatternet has an associated UPI determined as a function of information associated with the node 215 and the user of the node 215. In mathematical terms, UPI(X) represents the UPI of node X.

As stated above, the topology of the Bluetooth scatternet is optimized by directly connecting nodes with similar profiles or positioning nodes with similar profiles on the same piconet. To determine the degree of similarity between any two nodes, a Matching Profile Index (MPI) is defined as a function of the UPI for both nodes. As such, two nodes associated with users having similar profiles, for example, both enjoy the opera, are over 60 years of age, and are alumni of the same university, will have a more compatible MPI than will two nodes associated with users who do not share anything in common. The more compatible the MPI for two nodes, the more likely those nodes are to communicate. In mathematical terms, MPI(X,Y) is a function of the UPI(X) and the UPI(Y) where X and Y are Bluetooth enabled nodes 215 in the scatternet. Whether or not two nodes X and Y have similar profiles depends on the value of the MPI(X,Y).

Other indices forming the basis of the topology optimization methodology are defined as functions of the MPI. The Piconet Profile Index (PPI) is calculated for a node with respect to a piconet. In mathematical terms, the PPI(X,P(Y)) (meaning the PPI of node X with respect to the piconet for which node Y is the master) equals the sum of MPI(X, Z) for all Z where Z is a node on the piconet for which Y is the master.

The Maximum Piconet Profile Index (MPPI) is also calculated for a node with respect to a piconet. In mathematical terms, the MPPI(X,P(Y)) (meaning the MPPI of node X with respect to the piconet for which Y is the master) equals the maximum MPI(X,Z) where Z is a node on the piconet for which Y is the master.

The Piconet Diff Profile Index (PDPI) is a metric used to optimize the scatternet topology by minimizing the number of piconets in the topology. The PDPI measures the difference between any two piconets and is defined as |PPI(X, P(Y))−PPI(X, P(Z))|. When the PDPI for a node in a piconet is below a threshold, that node will not be disconnected from the piconet.

Figure 3:
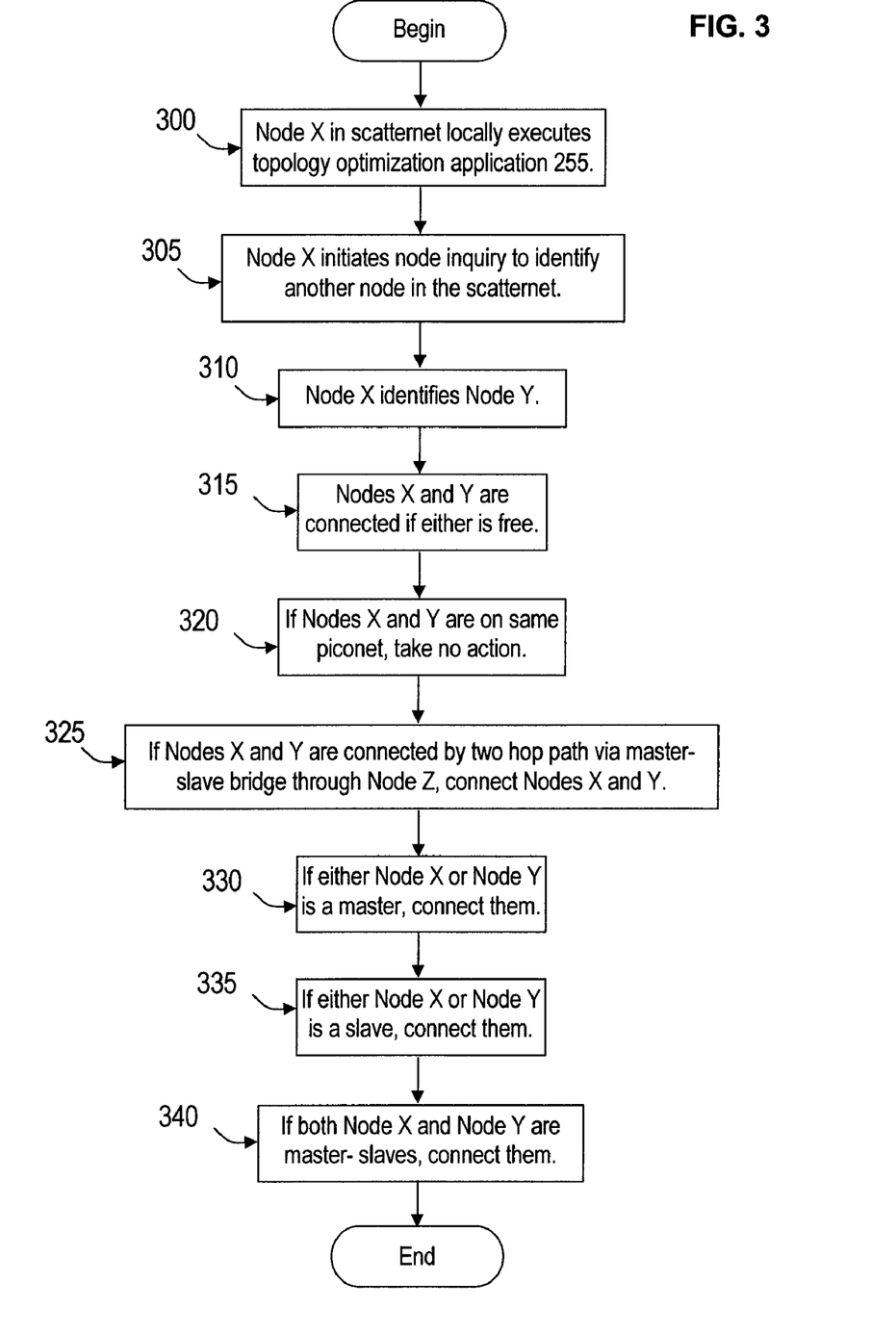
FIG. 3 is a logic diagram for an illustrative method of optimizing the topology of a Bluetooth scatternet for social networking.

Referring next to FIG. 3, a flowchart is provided to illustrate various method embodiments for optimizing the topology of a Bluetooth scatternet, including the representative scatternet comprising the Bluetooth enabled devices 215 depicted in FIG. 2. These methods begin when a node, for example, node X, in the scatternet locally executes the topology optimization application 255 (recall FIG. 2) (block 300). As stated previously, a copy of the topology optimization application 255 resides on each node in the scatternet.

Upon execution, the application 255 steps through the algorithm for optimizing the topology of the scatternet, beginning with an inquiry by node X to discover other nodes in the scatternet (block 305). Node inquiry is performed periodically based on parameters, including the inquiry length, defined as the time duration for which the node will be performing the inquiry, the max period length, defined as the maximum time duration between two consecutive inquiries, and the min period length, defined as the minimum time duration between two consecutive inquiries. These parameters are chosen randomly for each node in the scatternet so that the node inquiry of one node will not be synchronized with the node inquiry of another node.

Once another node in the scatternet, for example, node Y, is identified (block 310) and assuming these nodes are not already directly connected, nodes X and Y may be directly connected and an existing connection with a third node may be severed if certain conditions are met.

If either node X or node Y has a role designated as "free", the two nodes are connected (block 315). Also, if node X is the free node, node X is connected to node Y as the slave of node Y. Alternatively, if node Y is the free node, node Y is connected to node X as the slave of node X. This step assures that all nodes in the scatternet have a designated role other than "free", i.e. each node is a master, slave, or master-slave, and are connected to at least one other node.

If nodes X and Y are already positioned on the same piconet, no action is taken and the application 255 continues (block 320).

If node X and node Y are connected by two hops via a master slave bridge through a third node, for example, node Z, the connection between node X and node Z or between node Y and node Z may be severed and nodes X and Y directly connected (block 325). In general, nodes X and Y are connected if they have more similar profiles than do nodes X and Z. Thus, this step optimizes the scatternet topology by directly connecting nodes with similar profiles.

Specifically, if node X is a slave to node Z, node Z is a slave to node Y, and either the MPI(X,Y) is greater than the MPI(X,Z) or the quantity equal to PPI(X,P(Z))−PPI(X,P(Y)) is less than the PDPI, then node X disconnects from node Z and connects to node Y as the slave of node Y. Alternatively, if node Y is a slave to node Z, node Z is a slave to node X, and either the MPI(X,Y) is greater than the MPI(X,Z) or the quantity equal to PPI(X,P(Z))−PPI(X,P(Y)) is less than the PDPI, then node Y disconnects from node Z and connects to node X as the slave of node X.

Node X and node Y may be connected if either node, but not both, is a master (block 330). If either node, but not both, is a master, the node which is not the master is connected to the other node as the other node's slave. More plainly stated, if node X is a master and node Y is not, node Y is connected to node X as the slave of node X. Alternatively, if node Y is a master and node X is not, node X is connected to node Y as the slave of node Y. This step also assures a connected topology.

Node X and node Y may be connected if either node, but not both, is a slave (block 335). If node X is a slave and the MPPI(X,P(M(X))) is less than the MPI(X,Y), node X disconnects from its current master, designated as M(X), and connects to node Y as the slave of node Y. Alternatively, if node Y is a slave and the MPPI(Y,P(M(Y))) is less than the MPI(X,Y), node Y disconnects from its current master, M(Y), and connects to node X as the slave of node X. Thus, this step optimizes the scatternet topology by directly connecting nodes with similar profiles.

Node X and node Y may be connected if both are master-slave nodes (block 340). If the MPPI(X,P(M(X))) is less than the MPI(X,Y), node X disconnects from its current master, M(X), and connects to node Y as the slave of node Y. Alternatively, if the MPPI(Y,P(M(Y))) is less than the MPI(X,Y), node Y disconnects from its current master, M(Y), and connects to node X as the slave of node X. Similar to the previous step, this step optimizes the scatternet topology by directly connecting nodes with similar profiles. This step also completes the algorithm executed by the topology optimization application 255.

As stated above, this method begins when the topology optimization application 255 is executed locally on a node within the scatternet, referred to here as node X (recall block 300). Node X then performs an inquiry to identify other nodes within the scatternet (recall 305). The topology of the scatternet is optimized by directly connecting nodes with similar profiles or positioning them on the same piconet while at the same time minimizing the number of piconets in the scatternet (recall blocks 310 through 340). Moreover, the method embodiment is also executed by each node in the scatternet to optimize the topology of the scatternet.

Also as stated above, FIG. 3 illustrates various method embodiments for optimizing the topology of a Bluetooth scatternet. One skilled in the art will readily appreciate that the method steps may be performed in a different order to achieve the same result, namely an optimized topology for the scatternet. Thus, other method embodiments comprise these same or perhaps different steps, although the topology optimization application 255 executes them in a different order.

Figure 4:
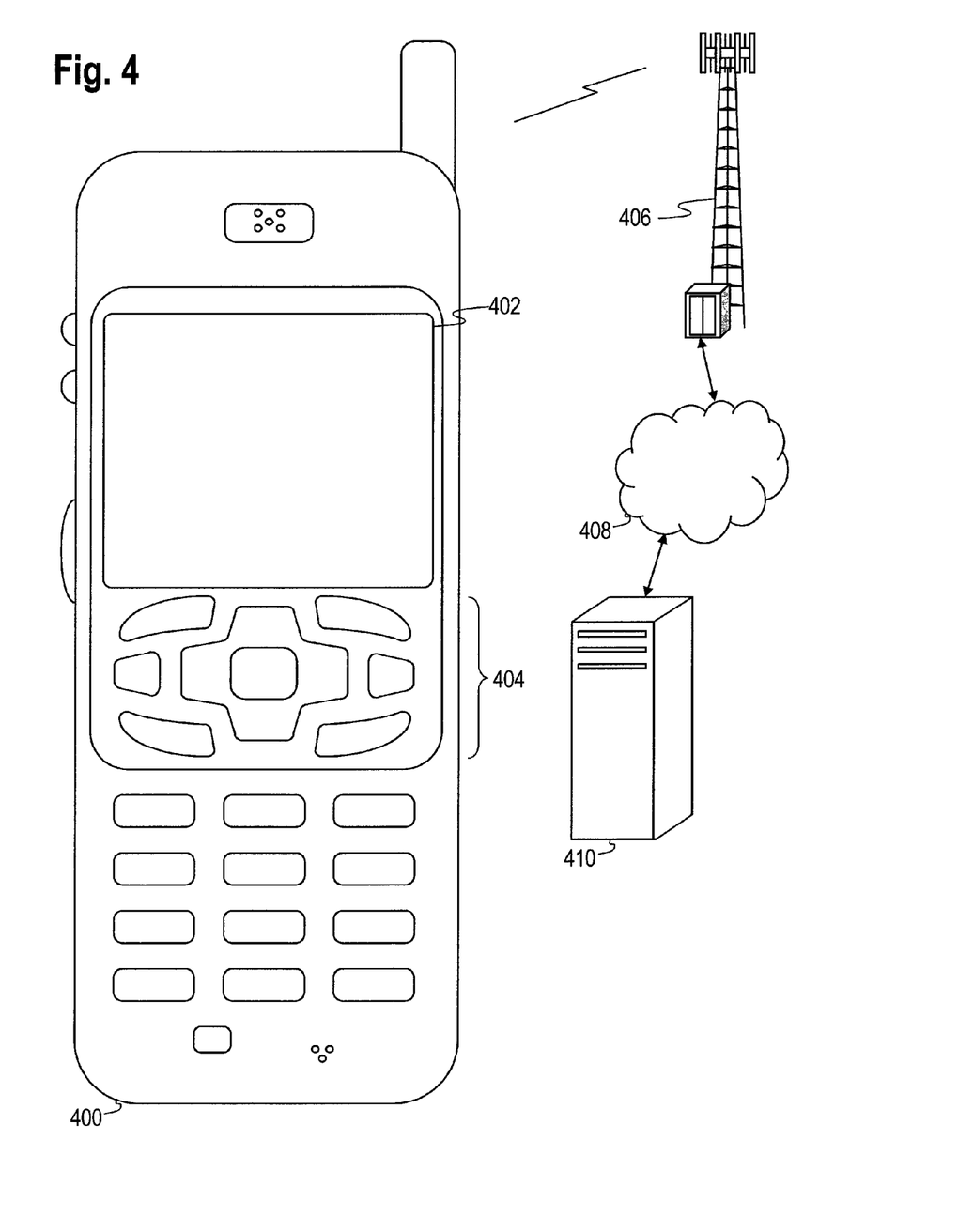
FIG. 4 is a diagram of a wireless communications system including a handset operable for some of the various embodiments of the disclosure.

FIG. 4 shows a wireless communications system including a handset 400 that may be operable for implementing aspects of the present disclosure, but the present disclosure should not be limited to these implementations. Though illustrated as a mobile phone, the handset 400 may take various forms including a wireless handset, a pager, a personal digital assistant (PDA), a portable computer, a tablet computer, or a laptop computer. Many suitable handsets combine some or all of these functions. In some embodiments of the present disclosure, the handset 400 is not a general purpose computing device like a portable, laptop or tablet computer, but rather is a special-purpose communications device such as a mobile phone, wireless handset, pager, or PDA. The handset 400 might be substantially similar to the nodes 120 of FIG. 1.

The handset 400 includes a display 402 and a touch-sensitive surface or keys 404 for input by a user. The handset 400 may present options for the user to select, controls for the user to actuate, and/or cursors or other indicators for the user to direct. The handset 400 may further accept data entry from the user, including numbers to dial or various parameter values for configuring the operation of the handset 400. The handset 400 may further execute one or more software or firmware applications in response to user commands. These applications may configure the handset 400 to perform various customized functions in response to user interaction.

Among the various applications executable by the handset 400 are a web browser, which enables the display 402 to show a web page. The web page is obtained via wireless communications with a cell tower 406, a wireless network access node, or any other wireless communication network or system. The cell tower 406 might be substantially similar to the communications tower 210 of FIG. 2. The cell tower 406 (or wireless network access node) is coupled to a wired network 408, such as the Internet, which might be substantially similar to the computer network 205 of FIG. 2. Via the wireless link and the wired network, the handset 400 has access to information on various servers, such as a server 410. The server 410 may provide content that may be shown on the display 402. The server 410 might be substantially similar to the server 245 of FIG. 2.

Figure 5:
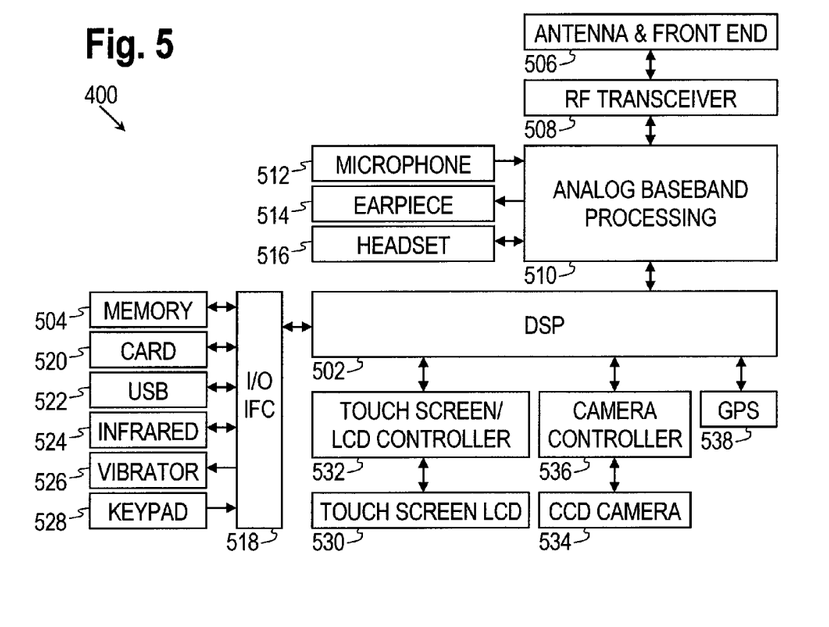
FIG. 5 is a block diagram of a handset operable for some of the various embodiments of the disclosure.

FIG. 5 shows a block diagram of the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538.

The DSP 502 or some other form of controller or central processing unit operates to control the various components of the handset 400 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 400 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the handset 400 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the handset 400 to function as a peripheral device to exchange information with a personal computer or other computer system. The infrared port 524 and other optional ports such as a Bluetooth interface or an IEEE 802.11 compliant wireless interface may enable the handset 400 to communicate wirelessly with other nearby handsets and/or wireless base stations.

The input/output interface 518 may further connect the DSP 502 to the vibrator 526 that, when triggered, causes the handset 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. Various other peripherals may also be included to provide additional functions, e.g., radio and television reception.

Figure 6:
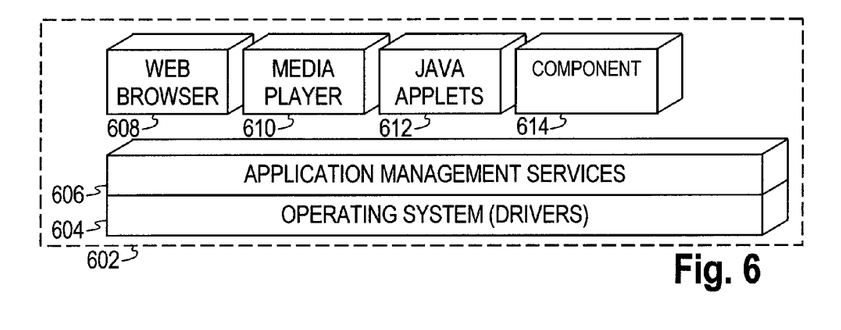
FIG. 6 is a diagram of a software environment that may be implemented on a handset operable for some of the various embodiments of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 400. Also shown in FIG. 6 are a web browser application 608, a media player application 610, and Java applets 612. The web browser application 608 configures the handset 400 to operate as a web browser, allowing a user to enter information into forms and select links to retrieve and view web pages. The media player application 610 configures the handset 400 to retrieve and play audio or audiovisual media. The Java applets 612 configure the handset 400 to provide games, utilities, and other functionality. A component 614 might provide functionality related to topology optimization in a scatternet.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A wireless device comprising:
   a processor configured to execute a topology optimization application stored on the wireless device, the topology optimization application configured to:
   determine a user profile of a user of the wireless device;
   encode the user profile to create a user profile index;
   use the user profile index and a matching profile index to determine a relationship of the wireless device to a second node in a scatternet network, the matching profile index having a value that is a function of the user profile index of the user of the wireless device and a user profile index associated with the second node; and
   use the relationship to configure a topology of the scatternet network to position the wireless device and the second node as part of a piconet when the value of the matching profile index indicates the wireless device and the second node have a high degree of similarity as compared to other nodes in the piconet,
   wherein positioning the wireless device and the second node as part of a piconet comprises disconnecting at least one of the wireless device and the second node from a third node when the wireless device and the second node are connected by a two hop path via a third node and the third node has a lower degree of similarity to the wireless device and the second node.

2. The wireless device of claim 1, wherein the user profile includes at least one of a demographic information about the user, user preferences, and information related to the wireless device.

3. The wireless device of claim 1, wherein the processor is further configured to define the network topology to minimize a number of piconets in the scatternet network.

4. The wireless device of claim 1, wherein a server associated with a telecommunication provider stores a primary source of the topology optimization application and an updated version of the topology optimization application is periodically transmitted to the wireless device from the telecommunication provider.

5. The wireless device of claim 1, wherein the processor is further configured to configure the network topology by connecting at least the wireless device to other wireless devices depending on a role of the wireless device.

6. The wireless device of claim 5, wherein the role of the wireless device is one of the group consisting of master, slave, free, and master-slave.

7. The wireless device of claim 6, wherein the processor is further configured to configure the network topology by connecting at least some wireless devices with role designations as free to other wireless devices.

8. The wireless device of claim 6, wherein the processor is further configured to configure the wireless network topology such that users with similar user profiles communicate directly or as part of the piconet by connecting at least some devices with role designations as master to other devices.

9. A method for configuring a topology of a scatternet network, comprising:
   defining profiles for one or more users of wireless devices;
   executing a topology optimization application stored on at least some of the wireless devices to configure the topology of the scatternet network based on the user profiles;
   encoding the user profiles to define a user profile index for each of the one or more users, wherein each wireless device is a node in the scatternet network;
   associating the user profile index for each of the one or more users with at least one node in the scatternet network;
   determining a matching profile index between two nodes in the scatternet network, the matching profile index having a value that is a function of the user profile indices associated with the two nodes; and
   configuring the topology to position the two nodes as part of a piconet when the value of the matching profile index indicates the two nodes have a high degree of similarity as compared to other nodes in the piconet, wherein positioning the two nodes as part of a piconet comprises disconnecting at least one of the two nodes from a third node when the two nodes are connected by a two hop path via a third node and the third node has a lower degree of similarity to the two nodes.

10. The method of claim 9, further comprising:
    minimizing a number of hops in the scatternet network between wireless devices having related user profiles.

11. The method of claim 9, further comprising:
    configuring the topology to directly connect the two nodes.

12. The method of claim 11, wherein configuring the topology further comprises disconnecting two nodes when the matching profile index indicates the two nodes have dissimilar user profiles.

13. The method of claim 11, wherein each node in the scatternet network stores the user profile index for the user associated with the node, a media access control address of the node, a role of the node, and piconet information.

14. The method of claim 13, wherein piconet information further comprises the role, the media access control address, and the user profile index of at least one other node on the piconet.

15. The method of claim 9, further comprising:
    minimizing a number of piconets in the scatternet network.

16. The method of claim 9, wherein each wireless device is a node in the scatternet network, and wherein each node in the scatternet network has a role designation, the role designation being one of the group consisting of master, slave, free, and master-slave.

17. A non-transitory computer-readable medium storing instructions that, when executed by a processor, promote performing a method comprising:
    determining a user profile of a user of a wireless device;
    encoding the user profile into a user profile index;
    determining a relationship of the wireless device to a second node in a scatternet network using the user profile index and a matching profile index, the matching profile index having a value that is a function of the user profile index of the user of the wireless device and a user profile index associated with the second node; and
    using the relationship to configure a topology of the scatternet network to position the wireless device and the second node as part of a piconet when the value of the matching profile index indicates the wireless device and the second node have a high degree of similarity as compared to other nodes in the piconet,
    wherein positioning the wireless device and the second node as part of a piconet comprises disconnecting at least one of the wireless device and the second node from a third node when the wireless device and the second node are connected by a two hop path via a third node and the third node has a lower degree of similarity to the wireless device and the second node,
    wherein the instructions comprise a topology optimization application stored on the wireless device.

18. The non-transitory computer-readable medium of claim 17, further comprising:
    using user profiles to configure the topology of the network including a plurality of wireless devices, each of the plurality of wireless devices having user profiles associated with users of the plurality of wireless devices.

19. The non-transitory computer-readable medium of claim 17, wherein the user profile includes at least one of a demographic information about the user, user preferences, and information related to the wireless device.

20. The non-transitory computer-readable medium of claim 17, wherein a network topology is defined to minimize a number of piconets in the scatternet network.

* * * * *